D. K. ALLISON.
MACHINE FOR MAKING PIES.
APPLICATION FILED APR. 1, 1909.
946,092.
Patented Jan. 11, 1910.
4 SHEETS—SHEET 1.
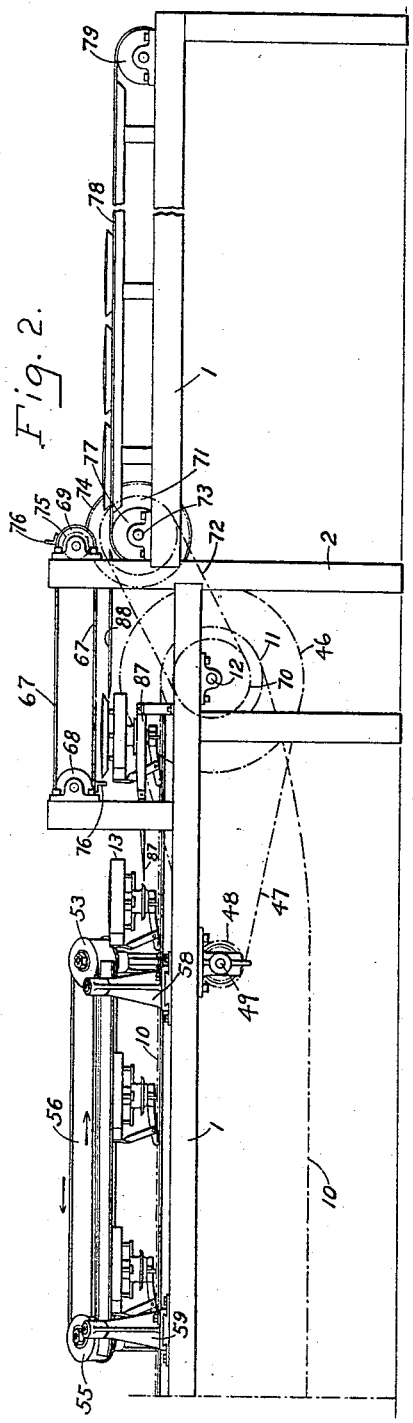
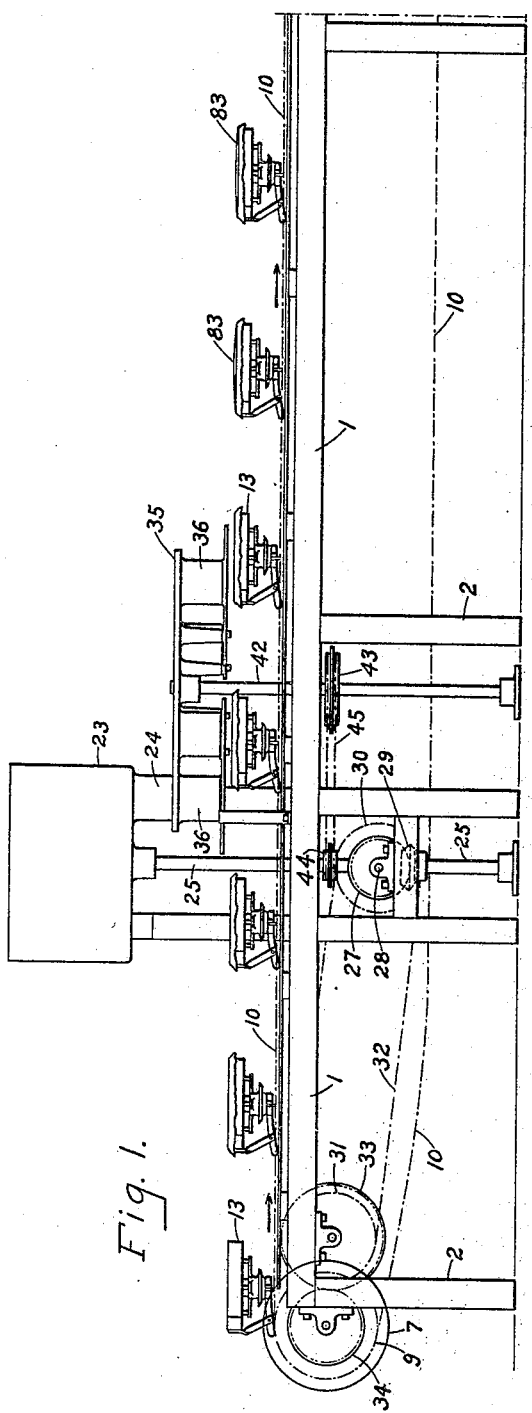
WITNESSES
Stewart L. Sharpless
Otto L. Koch
INVENTOR
Daniel K. Allison D. K. ALLISON.
MACHINE FOR MAKING PIES.
APPLICATION FILED APR. 1, 1909.
946,092.
Patented Jan. 11, 1910.
4 SHEETS—SHEET 2.
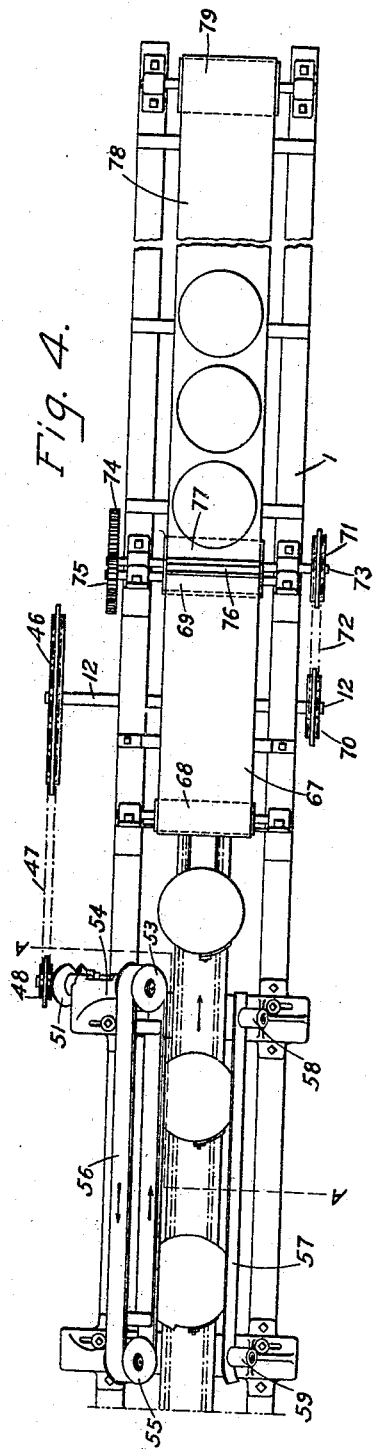
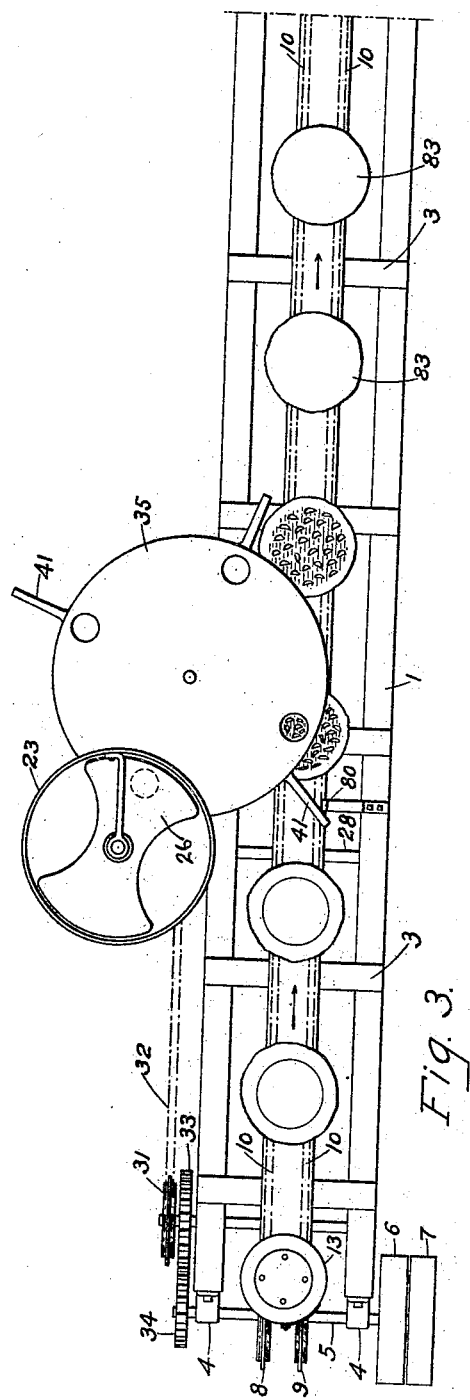
WITNESSES
Stewart L. Sharpless.
Otto L. Koch.
INVENTOR
Daniel K. Allison D. K. ALLISON.
MACHINE FOR MAKING PIES.
APPLICATION FILED APR. 1, 1909.
946,092.
Patented Jan. 11, 1910.
4 SHEETS—SHEET 3.
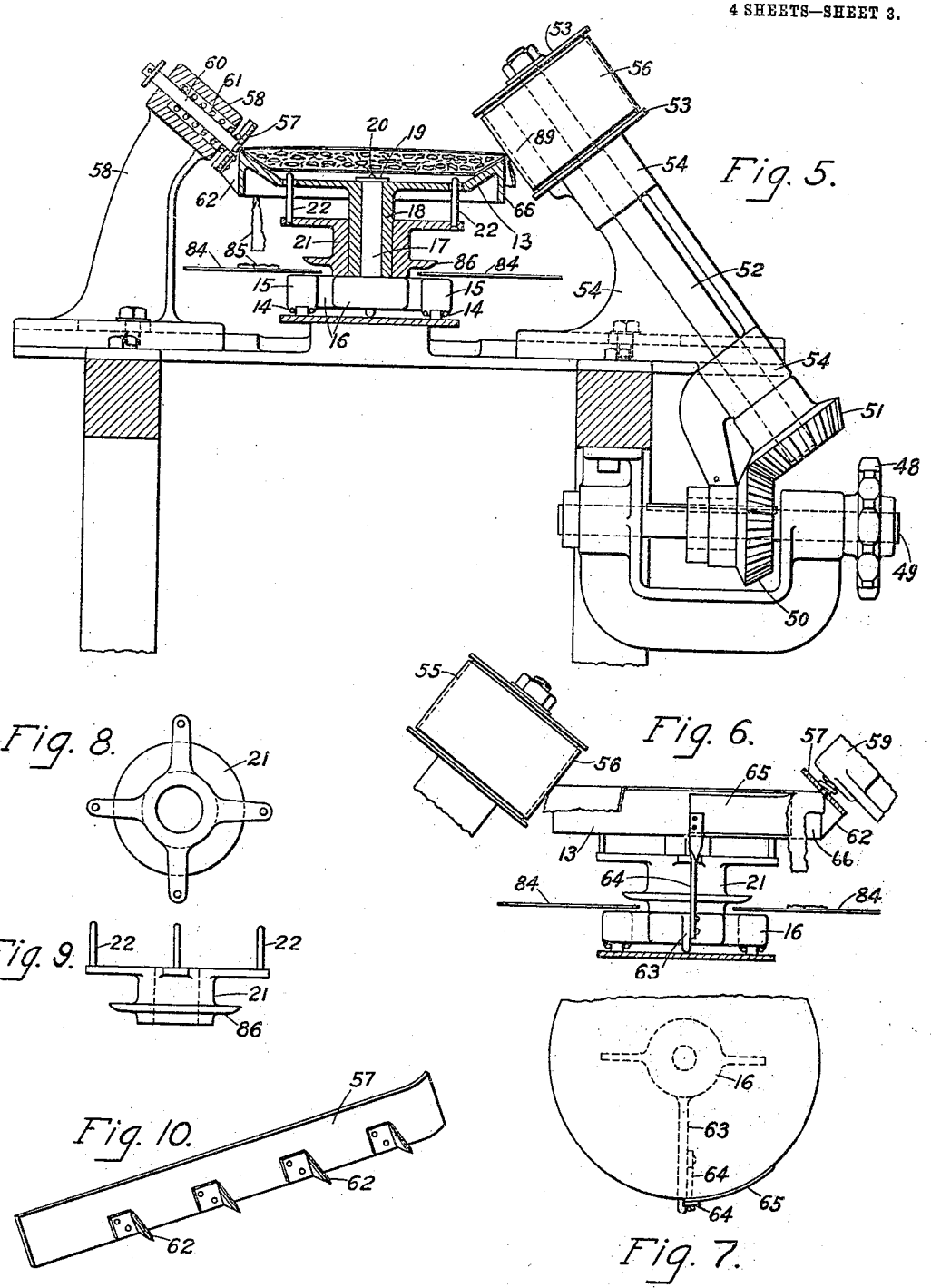
WITNESSES
Stewart L. Sharpless
Otto L. Koch
INVENTOR
Daniel K. Allison

D. K. ALLISON.
MACHINE FOR MAKING PIES.
APPLICATION FILED APR. 1, 1909.

946,092.

Patented Jan. 11, 1910.
4 SHEETS—SHEET 4.

WITNESSES
Stewart L. Sharpless
Otto L. Hock

INVENTOR
Daniel K. Allison

UNITED STATES PATENT OFFICE.

DANIEL K. ALLISON, OF NORWOOD, OHIO, ASSIGNOR TO THE J. H. DAY COMPANY, OF CINCINNATI, OHIO.

MACHINE FOR MAKING PIES.

946,092.  Specification of Letters Patent.  Patented Jan. 11, 1910.

Application filed April 1, 1909. Serial No. 487,303.

*To all whom it may concern:*

Be it known that I, DANIEL K. ALLISON, a citizen of the United States, residing at Norwood, in the county of Hamilton and State of Ohio, have invented certain new and useful Improvements in Machines for Making Pies, of which the following is a specification.

My invention relates to that class of machines in which an endless carrier is provided, upon which the pies are made while being conveyed through the machine and the main object of my invention is to provide a machine in which the pies are made in plates placed upon traveling cups, so that the pie plate may be started at one end of the machine and during its course of travel the bottom dough may be first placed on and, without interruption to the travel, the pies are automatically filled with fruit or other filling materials, and after the top dough is placed on, the pies are automatically trimmed of their surplus dough and sealed around their peripheries to prevent leakage; and finally the pies are automatically transferred to a conveyer on which they may be transported to any desired distance, preferably to a point within easy access of the oven.

The nature of my improvements will be more clearly understood by reference to the accompanying drawings, in which—

Figure 11:
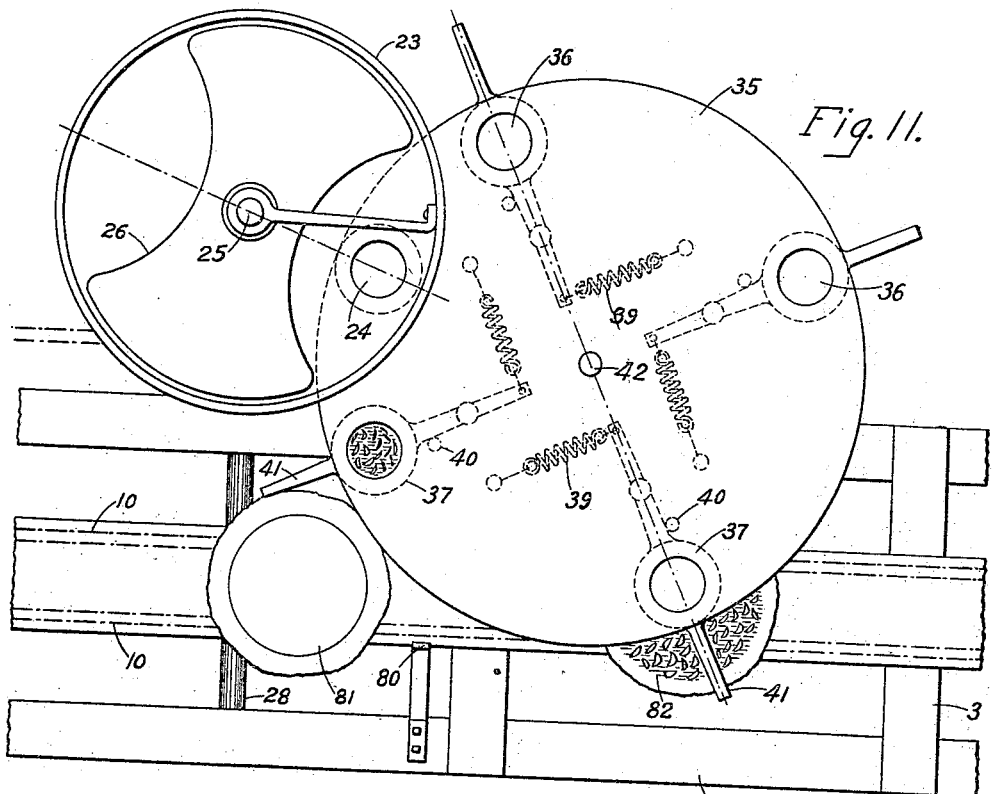
Figure 12:
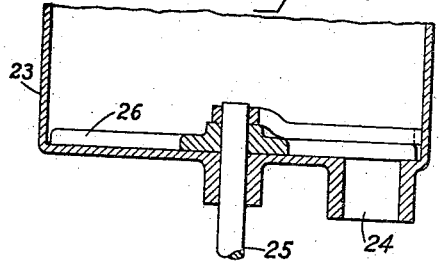
Figure 13:
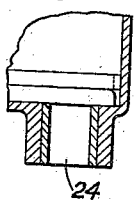
Figure 14:
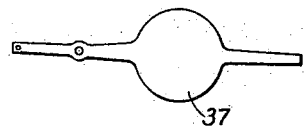
Figure 15:
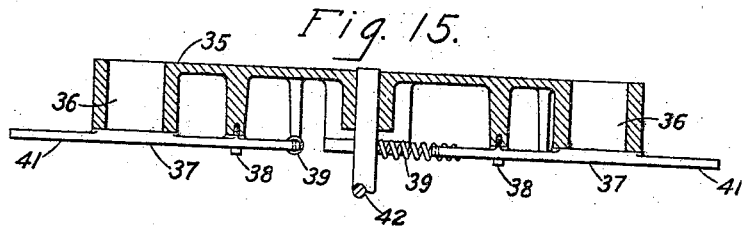

Figures 1 and 2 are continued views in elevation of my machine; Figs. 3 and 4 are also continued plan views of the parts shown in Figs. 1 and 2 respectively; Fig. 5 is an enlarged transverse section of the machine taken on the line A—A of Fig. 4; Fig. 6 is a rear elevation of part of the mechanism shown in Fig. 5; Fig. 7 is a partial plan view of a cup 13 showing the construction of the scraper 65; Fig. 8 is a plan view of the plate lifter 21; Fig. 9 is an elevation of the plate lifter 21; Fig. 10 is a detail in perspective of the yielding bar 57; Fig. 11 is a plan view of the reservoir 23 and the feeding mechanism coöperating therewith; Fig. 12 is a partial vertical section through the reservoir 23; Fig. 13 is a section through the pocket 24 showing a means of reducing the capacity of said pocket; Fig. 14 is a detail of the lever valve 37; Fig. 15 is a vertical section through the center of the circular plate 35.

I have chosen to mount my machine on a frame composed of side rails 1, legs 2 and cross ties 3 of any suitable material and put together in any suitable manner. Mounted in suitable journal boxes 4—4 is the transverse shaft 5 on which are mounted the tight and loose pulleys 6 and 7 to which the power is applied. The sprocket wheels 8 and 9 also mounted on shaft 5 carry the chains 10—10 which are supported at the opposite end of the machine by the sprocket wheels 11—11 mounted on shaft 12. The chains 10—10 carry a number of cups designated by 13—13 which are equally spaced and which are securely fastened to the said chains. The construction of these cups is shown in Fig. 5 in which 14—14 represent sections of the chains 10—10 with upturned dogs 15—15. To these dogs is secured the cross bar 16. Secured to this cross bar 16 is the vertical stud 17 upon which is rotatably mounted the cylindrical portions 18. The cup is kept from falling off said stud, in its circuit through the machine, by the washer and screw 19 and 20. Mounted upon the cylindrical portion 18 and arranged to slide up and down thereon is the plate lifter 21 provided with the pins 22—22 which penetrate the bottom of said cups. Extending rearwardly from the cross bar 16 is the arm 63 supporting the upright bar 64 to which is attached the scraper 65. This scraper is used to scrape the downwardly extending flange or rim 66 of the cup 13. Details of this plate lifter are shown in Figs. 8 and 9. The reservoir 23 in which the fruit or pie filling materials are placed, is shown in Figs. 1 and 3 and the enlarged views of Figs. 11 and 12. This reservoir is rigidly mounted on one side of the machine and above the cups 13 as shown in Figs. 1 and 3 and is provided with the pocket 24 in the bottom. Extending downwardly through the center of said reservoir is the vertical shaft 25 which revolves the plate 26 located in the bottom of said reservoir. The shaft 25 receives its movement from the driving shaft 5 through the bevel gear 27 mounted on shaft 28 and its companion gear 29 mounted on shaft 25, the sprocket wheels 30 and 31 and chain 32, and the spur gears 33 and 34, but it may be driven in any suitable manner. Beneath the reservoir 23 and coöperating therewith is the circular plate 35 mounted upon the vertical shaft 42 by which it is rotated, this shaft, in turn, receiving its movement from shaft 25 through the sprocket wheels 43 and 44 and chain 45. or by any other suitable means. This plate 35 has a series of pockets 36—36 projecting beneath the same. These pockets 36—36 are provided with lever valves 37—37 which when closed form bottoms for the said pockets. The lever valves are fitted closely to the bottoms of the said pockets, being held by the screws 38—38 which also form pivots upon which the valve levers may be oscillated to open and close the said pockets 36—36 as will be more fully explained hereinafter. To one end of the valve levers are attached the springs 49—49 which serve to keep the said valve levers closed as shown in Fig. 11, the studs 40—40 serving as stops to limit the movement of said valve levers. These valve levers are also provided with extensions 41—41 used to trip the valves open in the operation of the machine, which operation will also be explained hereinafter. On one end of the shaft 12 the sprocket wheel 46 is mounted, driving the chain 47 which in turn drives sprocket wheel 48 mounted on the shaft 49 shown in Figs. 5, 4, and 2. On the same shaft is the bevel gear 50 driving the bevel gear 51, which in turn drives the shaft 52 and the pulley 53 mounted thereon. Shaft 52 is journaled in the bracket 54. The pulley 55 is similar to pulley 53 and over these two pulleys the endless belt 56 travels. Opposite the belt 56 and parallel thereto is the yielding bar 57 which is held by the studs 60—60 mounted in the brackets 58 and 59. The compression springs 61—61 enable the bar 57 to yield when excessive pressure is exerted against its surface. This yielding bar has a number of knives 62—62 secured to its surface as shown in Fig. 10, the function of which will be explained hereinafter. The endless belt 67 mounted upon the rollers 68 and 69 rotatably mounted in suitable journal boxes secured to the frame work of the machine, as shown in Figs. 2 and 4, is driven from the shaft 12 by the sprocket wheels 70 and 71 and the chain 72, the shaft 73, the gears 74 and 75. The angle irons 76—76 are secured to this belt and travel with it. The roller 77 is mounted upon the shaft 73 and carries the endless belt or apron 78 which is supported at the end of the machine by the roller 79. This belt or apron may be any length desirable, as the finished pies are carried upon this belt to a point within easy access of the oven, or to any point desirable.

The operation of this machine is as follows: Power is applied to the pulley 6 which causes the chains 10—10 to travel in the direction indicated by the arrows, carrying with them the cups 13—13. Pie plates are placed upon these cups which are made to fit said pie plates. The bottom layer of dough is placed upon the pie plates by hand and as these pie plates pass beneath the circular plate 35 they are automatically filled with fruit or other pie filling materials, the operation of which is as follows: The fruit or other pie filling materials are placed in the reservoir 23 and as the plate 26 rotates the pocket 24 is filled with the material, the top surface of the circular plate 35 forming a bottom for the said pocket. At certain points in the revolution of the circular plate 35 its pockets 36—36 will come into vertical alinement with the said pocket 24 and the material will drop into the said pocket 36 and, while these two pockets are in vertical alinement, the plate 26 will cover the said pocket 24 and prevent materials from feeding into it. It will be noticed that this feeding process is accomplished by alternately opening the said pocket 24, first at the top for filling purposes, and then at the bottom for emptying. As the plate 35 revolves its pocket 36, now filled with pie filling materials, travels in the path of a moving pie plate and empties its contents into the pie plate beneath. This is accomplished by the extension 41 of the valve lever 37, being arrested in its movement with the said circular plate 35 by the tripping hook 80, mounted on the frame 1 shown in Figs. 3 and 11. Now as the circular plate continues to revolve the arresting of the said valve lever causes it to rotate upon the screw 38 sufficiently to completely uncover the bottom of said pocket 36, which action causes the contents of said pocket to empty into the pie plate beneath. As soon as the said valve lever passes beyond the said tripping hook 80 the valve lever will close by the action of the spring 39, as shown in Fig. 11. In Fig. 11 I have shown a pie plate at 81 with the bottom dough in it ready to be filled and at 82 a pie plate after it has been filled. In the same view I have shown one of the pockets 36 as it looks when filled with pie filling material. In Fig. 3 I have shown the valve lever 37 wide open with the filling material in the pie plate beneath. The pies are now covered with the top dough by hand and appear as shown at 83 in Figs. 1 and 3. They now pass through the trimming device where they are trimmed of their surplus dough and the top and bottom doughs are pressed together or sealed to prevent leakage. Also during this process the surplus dough or scrap would ordinarily drop in a continuous ring and wrap around the lower part of the cup and be carried by it in its circuit through the machine and thus be wasted, so I have devised means for cutting this scrap dough into short pieces so that it will drop upon the continuous apron 84 (shown in Fig. 5) and be carried by said apron to the end of the machine where it may be dropped into any suitable vessel.

In Fig. 5 I have shown pieces of scrap dough 85 as they would appear after being cut. As the pie plates enter the trimming device they assume the position shown in Fig. 5 and the belt 56 engages the periphery of the pie plate, being supported against sagging by the rigid bar 89 shown by the dotted lines in Fig. 5, and by means thereof exerts a pressure against the yielding bar 57. It is desirable to have the said pie plates roll along the surface of said yielding bar 57, so that in said rolling process the pressure exerted against said bar will cause the surplus dough to be pressed or cut off and the same to fall upon the apron 84 below. Now as the said pie plates are already traveling at a certain velocity, imparted by the chains 10—10, it will be necessary for the said belt 56 to travel at a velocity greater than that of the said pie plates in order to cause the said pie plates to roll along the surface of said yielding bar, and I have chosen to impart a velocity to said belt 56 which shall be double that of the said pie plates and at this velocity said belt will cause said pie plates to roll along the surface of said yielding bar without slipping and thereby cut the surplus dough from the pie plates without disfiguring the pie. After the pie plate has made one rotation the pie is completely trimmed of its surplus dough. The pressure exerted upon the dough by the belt and the yielding bar presses the two layers of dough together and completely seals it and thereby prevents leakage. The surplus dough is cut by the knives 62—62 as the cups roll along the surface of the yielding bar. This is caused by the flange 66 rolling over the cutting edges of the knives 62 and the surplus dough is squeezed between the two and cut into fragments, after which these fragments are kept from adhering to the said flange 66 by the scraper 65 which throws them off and they drop on the apron 84 as before described. The action of the scraper 65 upon the surplus dough is illustrated in Fig. 6. After the pie has passed beyond the trimming device the plate lifter 21 is elevated by its circular extension 86 riding upon the tapered track 87. This serves to lift the pie plate above the cup 13, as seen in Fig. 2, and at this juncture the angle iron 76, carried by the endless belt 67, pushes the pie plate onto the stationary plate 88 and carries it along and finally delivers it onto the apron 78. In order to perform its function properly it is necessary that the belt 67 should travel at a higher velocity than that of the cups.

Having now described my invention, what I claim and desire to secure by Letters Patent is:

1. In a machine for making pies, the combination with means for conveying the pies in succession through the machine, and means for automatically filling the pies, of means for automatically trimming the pies of their surplus dough, together with means for automatically cutting the said surplus dough or scrap into pieces so that the same may be collected without the use of manual means.

2. A pie trimming device comprising a yielding bar and a belt running parallel therewith, said belt being arranged to roll a pie plate along the surface of said bar and exert pressure at the point of contact between the said pie plate and said bar, and means for driving said belt, and means for preventing said belt from yielding under said pressure.

3. A pie trimming device comprising an endless carrier having a series of cups for holding and conveying pie plates, a yielding bar mounted parallel with the line of travel of said endless carrier, an endless moving belt arranged to engage the peripheries of said pie plates and cause the same to roll along the surface of said yielding bar, and means for driving said belt at a velocity approximately double that of the said endless carrier.

4. In a machine for making pies the combination with means for feeding pies in succession through the machine and means for trimming said pies of their surplus dough during their travel, of a plurality of knives arranged to cut the said surplus dough and an endless apron below said knives arranged to catch said surplus dough and carry it to a point of delivery.

DANIEL K. ALLISON.

Witnesses:
OTTO L. KOCH,
WALTER L. FORD.